United States Patent
Kelly (10) Patent No.: US 8,576,089 B1
(45) Date of Patent: Nov. 5, 2013

(54) SYSTEM AND METHOD FOR FACILITATING CONNECTION OF FIBER OPTIC DATA COMMUNICATION SYSTEMS

(71) Applicant: Google Inc., Mountain View, CA (US)

(72) Inventor: James Fintan Kelly, Milpitas, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/735,495

(22) Filed: Jan. 7, 2013

Related U.S. Application Data (62) Division of application No. 12/855,973, filed on Aug. 13, 2010, now Pat. No. 8,368,533.

(51) Int. Cl.
  *G08B 5/24* (2006.01)
(52) U.S. Cl.
  USPC ........... 340/687; 340/540; 340/541; 340/550; 340/555; 340/4.3; 340/10.1; 385/78; 385/88; 385/89; 385/92
(58) Field of Classification Search
  USPC ......... 340/687, 540, 541, 4.3, 10.1, 550, 555; 385/78, 88, 89, 92
  See application file for complete search history.

(56) References Cited

U.S. PATENT DOCUMENTS

| 4,449,247 A | 5/1984 | Waschka, Jr. |
| 5,241,610 A | 8/1993 | Labiche et al. |
| 5,754,941 A | 5/1998 | Sharpe et al. |
| 2005/0238292 A1* | 10/2005 | Barnes et al. .................... 385/78 |
| 2010/0316344 A1* | 12/2010 | Bylander et al. ............... 385/134 |

* cited by examiner

*Primary Examiner* — Tai T Nguyen
(74) *Attorney, Agent, or Firm* — Lerner, David, Littenberg, Krumholz & Mentlik, LLP

(57) ABSTRACT

A system for data communication connection in an architecture including an optical fiber communication line running from a communication service provider source to a proximity of at least one building, a fiber optic branch line extending from a point along the communication line generally towards the at least one building, and a receptacle, comprises a communication unit, a fiber optic cable coupled to the communication unit, and at least one connector adapted to couple the branch line to the fiber optic cable coupled to the communication unit. The connector may reside within the receptacle, and at least one of the communication unit, the cable, the branch line, the connector, and the receptacle may provide a visual indication that coupling of the branch line and the cable is effected.

19 Claims, 5 Drawing Sheets

SYSTEM AND METHOD FOR FACILITATING CONNECTION OF FIBER OPTIC DATA COMMUNICATION SYSTEMS

CROSS-REFERENCE TO RELATED APPLICATIONS

This application is a divisional of U.S. application Ser. No. 12/855,973, filed on Aug. 13, 2010 now U.S. Pat. No. 8,368,533, the disclosure of which is incorporated herein by reference.

BACKGROUND OF THE INVENTION

An optical fiber is made up of a core, cladding, and a buffer coating. The core carries light pulses, the cladding reflects the light pulses back into the core, and the buffer coating protects the core and cladding from moisture, damage, etc. Optical fibers are widely used in fiber-optic communications, which permits transmission over longer distances and at higher bandwidths than other forms of communications. Such fibers are used instead of metal wires because signals travel along them with less loss and are also immune to electromagnetic interference. Optical fibers are also used for illumination, and are wrapped in bundles so they can be routed together, thus allowing illumination of tight spaces.

Today, optical fibers are widely used by communication services to route data to individual homes. For example, telephone companies, cable television companies, and internet service providers (ISPs) often utilize fiber optic cables to transmit data to a subscriber's home. However, running the fiber optic communication lines to the subscriber's home can be very time consuming and expensive. For example, in some residential areas, telephone and other communication lines are run aerially via telephone poles. In these areas, connections are made from the aerial line to a point in the user's home. This connection may require trained installers to route the aerial line down an exterior wall of the home, drill a hole in the wall, run the line through the house, etc. Other residential areas require communication lines to be run underground, for example, beneath roadways. Connecting these lines to a home may require digging up enough ground to locate the communication line, and then digging a path from the communication line to the user's home to run an adjoining line. Additionally, joining lengths of optical fiber is more complex than joining electrical wire or cable. The ends of the fibers must be carefully cleaved, and then spliced together either mechanically or by fusing them together with an electric arc. Special connectors are used to make removable connections.

SUMMARY OF THE INVENTION

One aspect of the disclosure provides a system for data communication connection in an architecture including an optical fiber communication line running from a communication service provider source to a proximity of a building, a fiber optic branch line extending from a point along the communication line generally towards the building, and a receptacle disposed at an end of the fiber optic branch line. The system comprises a communication unit, such as an optical network termination device, a telephone, a television set top box, or any other communication device. The communication unit may include a visual indicator. The system further comprises a fiber optic cable coupled to the communication unit, and at least one connector adapted to couple the branch line to the fiber optic cable coupled to the communication unit, the connector residing within the receptacle. The visual indicator of the communication unit provides a visual indication that coupling of the branch line and the fiber optic cable is effected, and the fiber optic cable relays the visual indication from the visual indicator to an opposing end of the fiber optic cable.

The visual indication may comprise illumination of a light emitting diode, such as one of a plurality of different colored light emitting diodes disposed on the communication unit. The connector may comprise a window for viewing the visual indication relayed to the opposing end of the fiber optic cable. According to one embodiment, a displacement box may be coupled between the communication unit and the branch line. The communication line, branch line, and receptacle may be located underground.

A second aspect of the disclosure provides a system for a data communication connection comprising an optical network termination device. The optical network termination device may comprise an optical data interface and a visual indicator unit. The system may further comprise an optical fiber coupled to the optical network termination device, wherein the visual indicator unit is coupled to at least one of the optical data interface and the optical fiber. The optical fiber may be adapted to transmit light from the visual indicator unit therethrough. The optical network termination device may further comprise a local indicator coupled to the visual indicator unit for providing a visual indication on the optical network termination device. This visual indicator unit may comprise at least one light emitting diode, and may be operable to determine whether the optical fiber is effectively coupled to another optical fiber. According to one embodiment, the visual indicator unit provides a visual indication in response to determining that the optical fiber is effectively coupled to another optical fiber.

Yet another aspect of the disclosure provides a method for establishing a connection to a communication service in an architecture including an optical fiber communication line running from a communication service provider source to a proximity of at least one building, a fiber optic branch line extending from a point along the communication line generally towards at least one building, and a receptacle. The method comprises providing a communication unit, coupling a fiber optic cable to the communication unit, providing at least one connector adapted to couple the branch line to the fiber optic cable coupled to the communication unit, and providing a visual indication related to whether coupling of the branch line and the cable is effected. The method may further comprise relaying the visual indication from the communication unit to an opposing end of the fiber optic cable, and the connector may comprise a window for viewing the visual indication relayed to the opposing end of the fiber optic cable.

According to one aspect, the above-described method may further comprise coupling the branch line to the cable via the at least one connector, and receiving a visual indication at an area proximal to the coupling of the branch line and the cable. This visual indication may be transmitted by the communication unit in response to the coupling of the branch line to the cable. The method may further comprise providing a displacement box outside the building, and coupling the displacement box between the communication unit and the branch line.

An even further aspect of the disclosure provides a kit of component parts for facilitating data communication connection in an architecture including an optical fiber communication line running from a communication service provider source to a proximity of at least one building, a fiber optic branch line extending from a point along the communication line generally towards the at least one building, and a receptacle. The kit may comprise a communication unit, a fiber optic cable for coupling to the communication unit, and at least one connector adapted to couple the branch line to the fiber optic cable coupled to the communication unit, the connector sized to fit within the receptacle, wherein at least one of the communication unit, the cable, the branch line, the connector, and the receptacle is adapted to provide a visual indication when coupling of the branch line and the cable is effected.

Yet another aspect of the disclosure provides a system for facilitating data communication connection to a building from an optical fiber communication line running underground from a communication service provider source to a proximity of the building, the system comprising an underground fiber optic branch line coupled to the fiber optic communication line and having a terminal end extending generally towards the building, and a receptacle housing the terminal end of the fiber optic branch line, wherein the receptacle is disposed substantially underground and is accessible from above ground. Further, a connector may be coupled to the terminal end of the fiber optic branch line and reside within the receptacle. The connector may include a window for viewing light transmitted through a fiber optic cable coupled to the branch line via the connector.

Another aspect of the disclosure provides a method for facilitating data communication connection to a building from an optical fiber communication line running underground from a communication service provider source to a proximity of the building, the method comprising coupling a first end of a fiber optic branch line to the fiber optic communication line, running the branch line underground so that a second end extends generally towards the building, and installing a receptacle substantially underground to house the second end of the fiber optic branch line. This method may further comprise coupling a connector to the second end of the fiber optic branch line within the receptacle, wherein the connector comprises a window for viewing light transmitted through a fiber optic cable coupled to the branch line via the connector.

DETAILED DESCRIPTION

Figure 1:
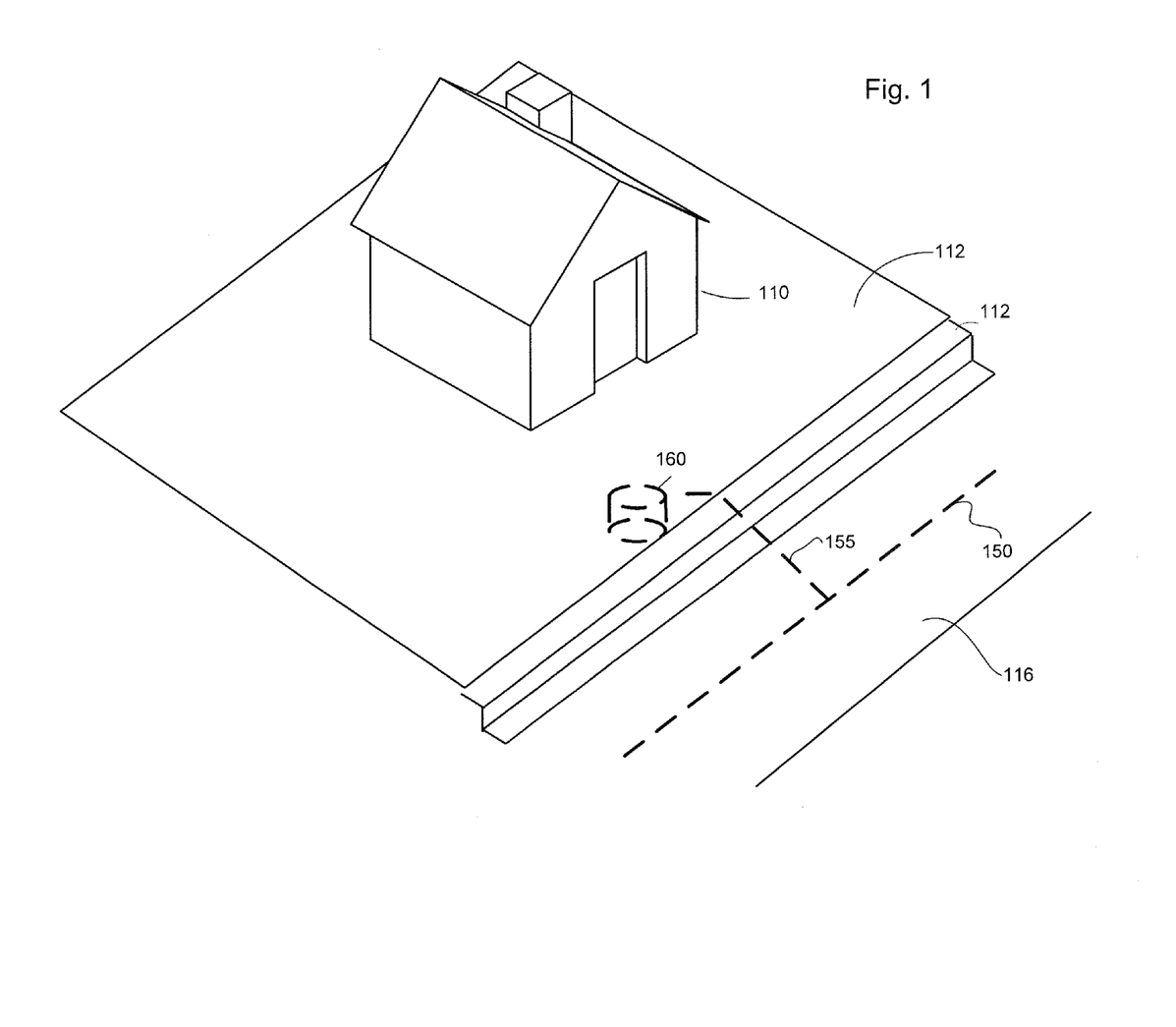
FIG. 1 is a system diagram according to an aspect of the disclosure.

FIG. 1 illustrates a scenario according to an aspect of the disclosure. As shown, a house 110 sits on a lot 112, which is separated from roadway 116 by a curb 114. Communication line 150 runs underneath the roadway 116. However, communication line 150 may also be run overhead, depending on zoning regulations where the house 110 is located, etc. The communication line 150 may be any type of line transmitting any type of information, such as voice, data, etc. For purposes of the present example we assume that the communication line 150 is a fiber optic line.

Rather than running a line from communication line 150 directly to the house 110, as in conventional systems, the communication line 150 is run to a receptacle 160 via branch line 155. The receptacle 160 may be an underground handhole which houses a connector to the fiber optic communication line 150. It may be placed anywhere between the curb 114 and the house 110. A most cost-effective placement of the receptacle 160 may be on the lot 112 just inside the curb 114.

The receptacle 160 may be any type of housing for electronic components. For example, it may be any shape, such as cylindrical, cubical, etc., and it may be made of any material, such as plastic, metal, etc. It may be disposed above ground, for example, in an above-ground electrical box on a pole, on a roof, on an exterior wall of a house, etc. Alternatively, it may be disposed underground, as shown in FIG. 1.

Figure 3:
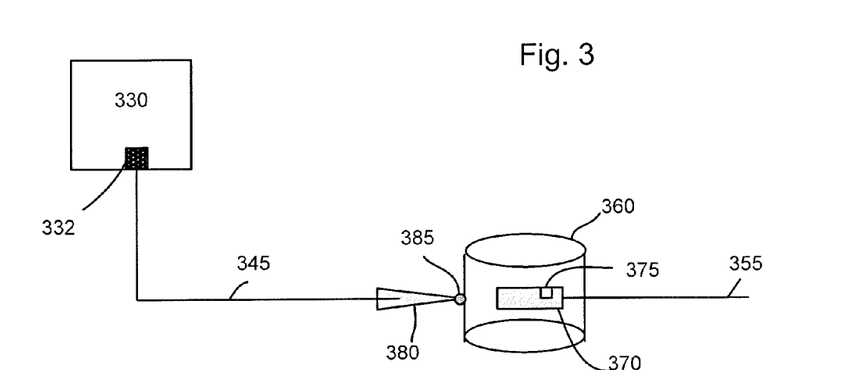
FIG. 3 is a schematic illustration of a disconnected fiber optic line according to an aspect of the disclosure.

Inside the receptacle 160, the branch line 155 may terminate in a connector, such as connector 370 shown in FIG. 3. The connector may be adapted to receive an end of a fiber optic cable. Alternatively, the connector may be adapted to receive a complementary connector attached to the end of the fiber optic cable.

Figure 2:
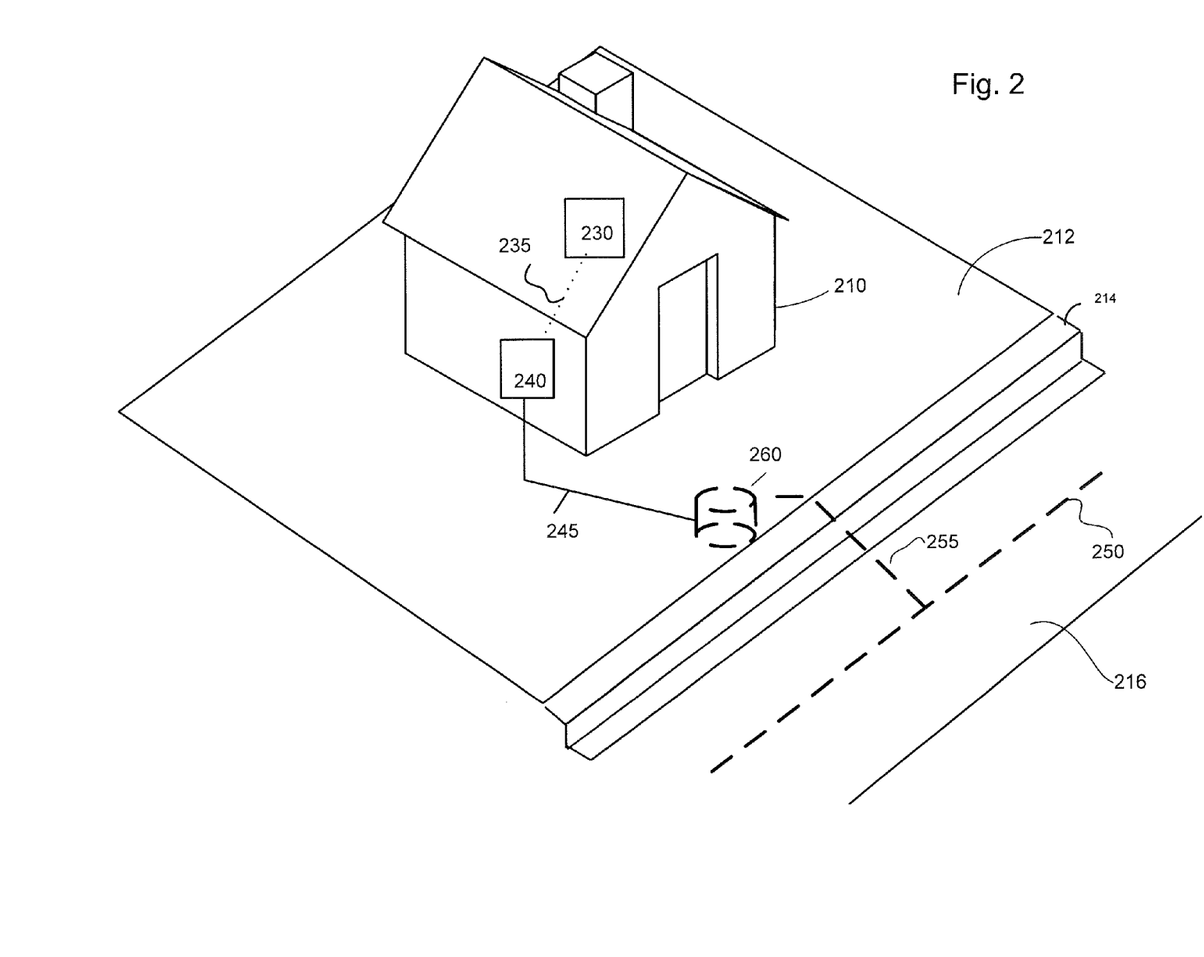
FIG. 2 is a system diagram according to another aspect of the disclosure.

As shown in FIG. 2, a communication unit, such as an optical network termination (ONT) device 230, resides within the house 210. The ONT device 230 may be an Internet connection device, such as a router or a modem, or any other communication terminal, such as a telephone, a television set-top box, etc. The ONT device 230 may be connected to the communication line 250 at the receptacle 260. For example, such connection may be performed by an owner or resident of the house 210, or it may be outsourced to a company providing such connection services.

According to one aspect of the disclosure, the ONT device 230 may be connected to the communication line 250 through a displacement box 240 residing on an exterior of the house 210. For example, the ONT device 230 inside the house 210 may be connected to the displacement box 240 via a connection 235, such as a fiber optic connection. An exterior line 245 may then be run from the displacement box 240 to the receptacle 260 to establish a connection between the ONT device 230 and the communication line 250.

The displacement box 240 may facilitate connection to the receptacle 260 in several regards. For example, the displacement box 240 enables the exterior line 245 to be completely outside the house 210, and thus it may be run underground. This eliminates a risk of disturbance of the exterior line 245 from individuals in the house 210. Further, the displacement box 240 shortens the required distance of the wired connection 235 from the ONT device 230. Such shortened required length also serves to reduce a risk of disconnection of the ONT device 230 from the communication line 250. Even further, the displacement box 240 enables multiple ONT devices 230 within the house 210 to be connected to the communication line 250 without running a separate cable from each to the underground receptacle 260.

According to one aspect of the disclosure, at least one of the ONT device 230 and the displacement box 240 may include an indicator, such as an indicator light, which indicates whether a connection between the ONT device 230 and the communication line 250 is complete. For example, the indicator light may include a red light emitting diode (LED) to indicate that the connection is incomplete, and a green LED to indicate that the connection is complete in the form of separate LEDs or a single bi-color LED. In this regard, a user running the connection from the ONT device 230 to the receptacle 260 will be able to visually determine if the ONT device 230 is operating disconnected from the communication line 250. Data communications between the ONT device 230 and the communication line 250 should remain unaffected by the presence of the indicator light.

According to another example, the indicator may be any other type of indicator, such as an aural indicator. For example, the indicator may emit one sound or pattern of sounds when connection between the ONT device 230 and the communication line 250 is complete, and another sound or no sound when the connection is incomplete.

In the example where connection 235 and exterior line 245 are fiber optic cables, a color of the indicator light may be seen at a tip of the fiber optic cable when an opposing end is connected to the ONT device 230. For example, when the cable is connected to the ONT device 230 at one end, but is not connected to the connector line 255 in the receptacle 260, the red indicator light may be carried through the fiber optic cable(s) to the tip where it is visible.

Figure 4:
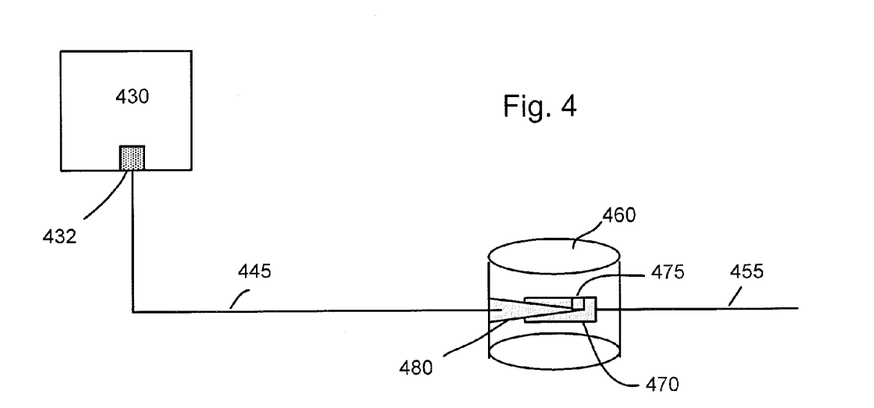
FIG. 4 is a schematic illustration of an effective connection of a fiber optic line according to an aspect of the disclosure.

FIGS. 3 and 4 demonstrate this concept. As seen in FIG. 3, ONT device 330 includes an indicator light 332. Connected to the ONT device 330 proximal to the indicator light 332 is fiber optic cable 345. For example, the indicator light 332 may be coupled to an input/output port for receiving the fiber optic cable 345. As mentioned above, the cable 345 may include a connector at its distal end, such as male connector 380. The male connector 380 may be structured such that light from the indicator 332 may be seen through the male connector 380. For example, as shown in FIG. 3, the connector 380 includes a transparent portion 385 near a tip thereof to enable light traveling through the fiber optic cable 345 to be visible through the transparent portion 385.

Inside receptacle 360, communication line 355 terminates at a connector 370. The communication line connector 370 may be adapted to receive an end of the cable 345, or may be adapted to receive a complementary connector. For example, communication line connector 370 may be a female connector adapted to engage male connector 380.

According to one aspect, the communication line connector 370 may include a window 375 to allow light from the fiber optic cable 345 to be seen therethrough. For example, if the male connector 380 is inserted into the connector 370, but not properly engaged, the indicator light 332 on the ONT device 330 may be red. This red light may travel through the fiber optic cable 345 and be seen at the tip 385 through the window 375 of the communication connector 370. Accordingly, a user would be alerted that the connection was not complete.

FIG. 4 illustrates the example where fiber optic cable 445 and communication line connector 480 are properly engaged, thus providing an effective coupling therebetween. Accordingly, indicator light 432 on ONT device 430 may display a green light, indicating that connection between the ONT device 430 and the communication line 455 is complete. This green light may be transmitted through the fiber optic cable 445 and connector 480 to a tip thereof. Similar to the example of FIG. 3, communication line 455 may terminate in a communication line connector 470 inside receptacle 460. The communication line connector may include window 475, through which light from a tip of the cable 445 is visible. Thus, the green light emitted by the indicator 432 and transmitted through the cable 445 may be seen through the window 475. In this regard, a user attempting to couple the ONT device 430 to the communication line 455 will receive visual affirmation that his efforts were successful.

Figure 5:
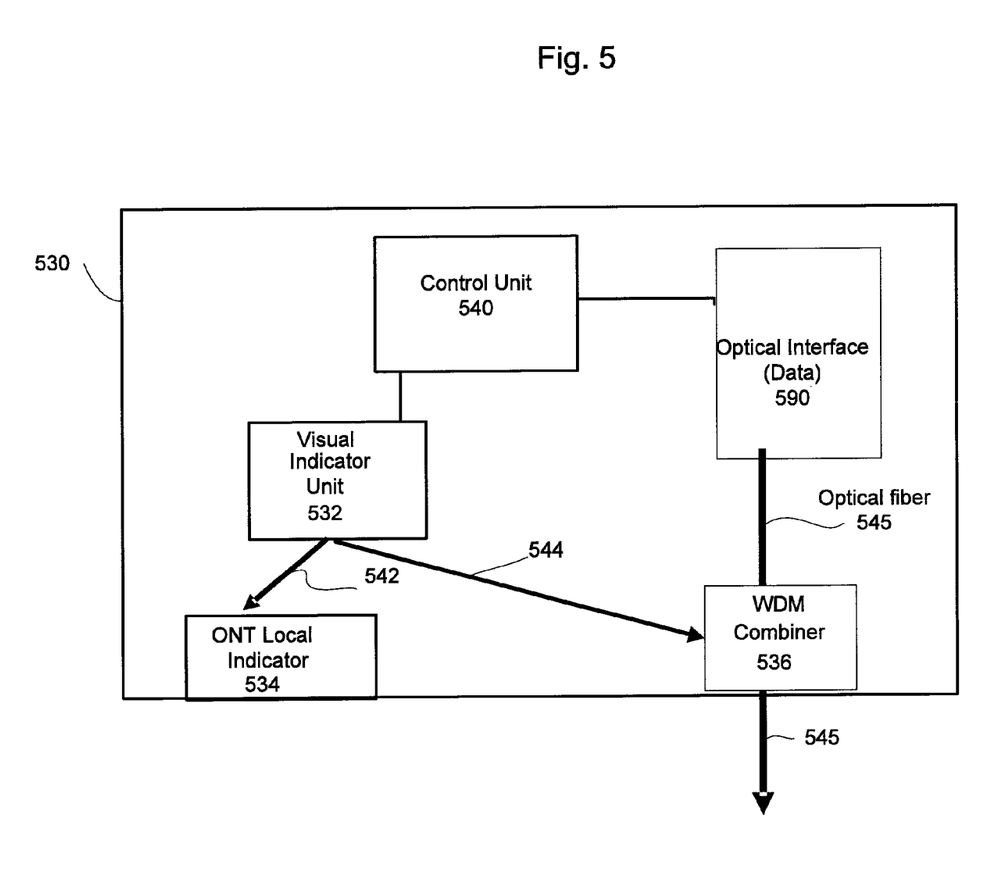
FIG. 5 is a schematic diagram of a device according to an aspect of the disclosure.

FIG. 5 provides a block diagram of an ONT device 530. The ONT device 530 includes an optical interface 590 which couples to the communication line (e.g., communication line 150 of FIG. 1) via optical fiber 545. The optical interface 590 may contain a laser transmitter and a photodiode receiver for data communications. The optical interface 590 may be coupled to one or more computing devices in a home, and may thus transmit information from the computing devices to other devices connected via the connection line 155 (e.g., any other computing device connected to the Internet). Similarly, the optical interface 590 may provide information transmitted through the communication line 150 to the one or more computing devices.

The ONT device 530 also includes visual indicator unit 532. The visual indicator unit 532 may include one or more light emitters, such as light emitting diodes (LEDs). For example, the visual indicator unit 532 may include a bi-color LED, or a separate red LED for indicating that the ONT device 530 is not connected to the communication line 150, and a green LED for indicating that the ONT device 530 is properly connected to the communication line 150. Alternatively, the visual indicator unit 532 may be a bitmap or liquid crystal display (LCD) display screen or any type of electronic visual indicator.

The optical interface 590 and the visual indicator unit 532 may also be connected to a control unit 540. The control unit 540 may be any type of processor or other device capable of executing instructions. For example, the control unit 540 may be programmed to switch the bi-color LED in the visual indicator unit 532 from red to green upon determining that the optical fiber 545 is connected to the optical interface 590 and the communication line 150. The control unit 540 may detect such connection by, for example, laser light received from the optical interface 590.

The visual indicator unit 532 may be connected to a local indicator 534 for the ONT device 530. The local indicator may be, for example, a window on a face of the ONT device 530 providing information from the visual indicator unit 532. The visual indicator unit 532 may be connected to the local indicator 534 via, for example, a light tube 542. Accordingly, in the instance where the visual indicator unit 532 includes a red or green LED, the light tube 542 would route the red or green light from the visual indicator 532 to the local indicator 534.

The visual indicator unit 532 may also be coupled to combiner 536. For example, the visual indicator unit 532 and the WDM combiner 536 may be connected via light tube 544. Also coupled to the combiner 536 may be the optical interface 590 and the optical fiber 545. In this regard, the combiner 536 may combine laser light from the optical interface 590 with visible light from the light tube 544 to provide a visual indication from the visual indicator unit 532 through the optical fiber 545. For example, when the visual indicator unit 532 illuminates a green LED to indicate that connection of the optical data interface 590 is complete, the combiner 536 may facilitate the transmission of the green light through the optical fiber 545. According to one aspect, the combiner 536 may be a passive wavelength division multiplexed (WDM) combiner. Accordingly, the combiner would not need to be electrically powered. Moreover, it would be wavelength selective. For example, laser communications wavelengths in the infrared could be combined with the visible LED light.

Figure 6:
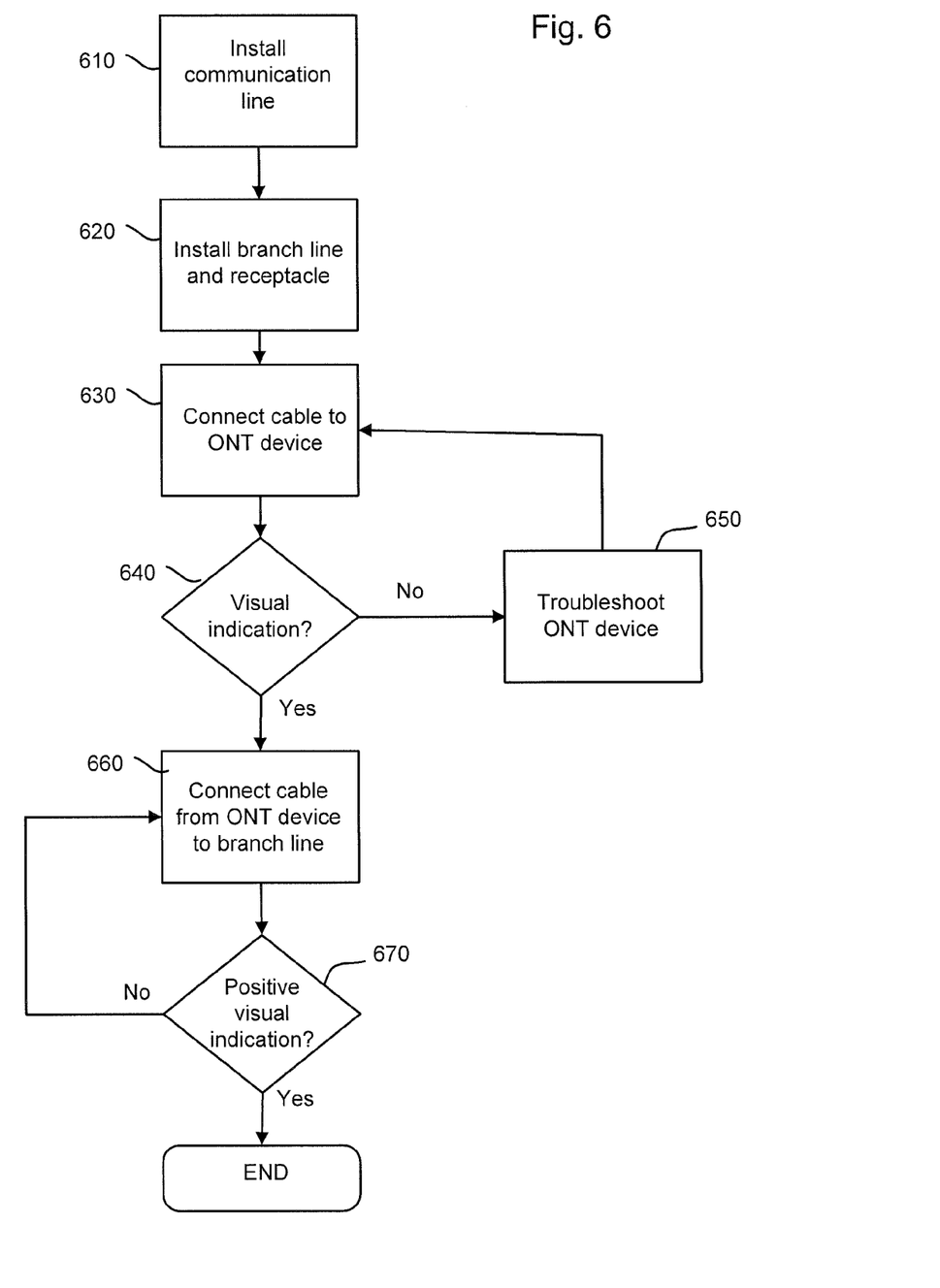
FIG. 6 is a method according to an aspect of the disclosure.

A method of connecting a communication line to a home using the above-described system is illustrated in FIG. 6. It should be understood that the steps of the method need not be performed in the particular sequence illustrated. Moreover, the steps need not all be performed by the same individual or entity. For example, while some steps may be performed by a communication service provider, other steps may be performed by a homeowner or an independent contractor.

In step 610, a communication line, such as the line 150 is installed. As discussed, the communication line 150 may be installed in any of a variety of ways, such as aerially or underground. Accordingly, the communication line 150 may extend a great distance to provide coverage to multiple homes and neighborhoods. The communication line 150 is preferably comprised of one or more fiber optic cables.

In step 620, a branch line, such as the branch line 155, is connected to the communication line 150 and installed to extend to a predetermined point. The predetermined point may be on or close to a homeowner's property. At the predetermined point, a receptacle housing a terminal end of the branch line 155 may also be installed. For example, the receptacle may be an underground hand-hole, such as the receptacle 160, with a cover protecting its contents while also providing access thereinto.

In step 630, a cable is connected to an ONT device inside the home. The ONT device may be a modem, a television set-top box, or the like. Alternatively, the ONT device may be a separate unit that may be coupled to modems, set-top boxes, computing devices, televisions, telephones, or other data transmitting/receiving devices in a home.

The ONT device may include a visual indicator viewable by a user. Accordingly, when the ONT device is powered on, or when the cable is connected thereto, it may provide an indication of such to the user. Using an example discussed above, the indication may be a red LED which is illuminated. Accordingly, in step 640 it is determined whether a visual indication is provided to the user. If no such indication is provided, it may be that there is a problem with the ONT device or with the cable connected thereto. Accordingly, the user may troubleshoot in step 650 to identify the problem and correct it. However, if a visual indication is provided, the ONT device is operating correctly, and the method may proceed to step 660.

In step 660, the cable from the ONT device may be connected to the branch line terminating in the receptacle. For example, the cable may be run outside the home and along a path to the receptacle. The path may be an aerial path, an underground path, or any other type, such as a path above ground and secured along a driveway. The cable and the branch line 155 may be connected via one or more connectors. For example, a particular connector device may be used to secure each of the lines to each other. Alternatively, one or both of the lines may be terminated in a connector, as discussed with respect to FIGS. 3-4, for ease of interconnection with each other.

In step 670, it may be determined whether a positive visual indication is given to indicate that the connection of the ONT device to the communication line (e.g., via the cable and the branch line) is complete. For example, referring back to FIG. 2, the visual indication from the ONT device 230 may be transmitted through the fiber optic cables 235 and 245 and viewable at an end of the cable 245 near the receptacle 260. Thus, in the example where a visual indication of a red light is given in step 640, this red light may pass through the cable and be viewed by the user at its distal end. However, when properly connected to the branch line 255 in the receptacle 260, the ONT device 230 may detect the connection. For example, a signal from the communication line 250 may be received by the ONT device 230. Accordingly, the ONT device 230 may display a different visual indication, such as a green light. This green light may similarly be transmitted through the fiber optic cable 235, 245 to be seen by the user at its distal end. If the user receives positive visual indication, the method may be ended as connection of the ONT device 230 is complete. However, if no positive visual indication is received (e.g., if the light at the distal end of the cable remains red), the user may attempt to reconnect the cable to the branch line 255.

Thus, a user may easily acknowledge a successful connection without returning inside the home to check the ONT device or any other connected devices. This provides a significant advantage as it prevents wasted time and frustration of trying to determine whether the ONT device is properly connected. An additional advantage is that this acknowledgement may be provided without requiring any additional manipulation of the fiber optic cable or installation of additional equipment. Rather, the fiber optic cable may be connected from one or more devices within the home to the communication line in the roadway or overhead with relative ease.

According to an alternative aspect, a separate visual indicator may be disposed within the receptacle to facilitate connection of the ONT device and the communication line from the service provider. For example, an LED may be housed in the receptacle, and may be illuminated to indicate whether connection was successful. This LED may be powered by, for example, a battery within the receptacle or a separate electrical line run from the home. In this regard, any type of wire may be used to form the connections between the ONT device and the service provider, and the wire would not need to transmit light therethrough.

According to one aspect, various components may be provided together in a kit. For example, the ONT device, one or more fiber optic cables for coupling the ONT device to the branch line, and at least one connector adapted to couple the fiber optic cables to each other or to the branch line may be provided together in a kit to a customer of a telephone company, cable company, and/or ISP. Further, instructions for connecting these components may also be included in the kit. In this regard, connection of computers, modems, routers, televisions, telephones, and other devices in the user's home to a communication service provider source may be further facilitated.

Although the present invention has been described with reference to particular embodiments, it should be understood that these examples are merely illustrative of the principles and applications of the present invention. For example, while the invention has been described above with respect to residential establishments, it should be understood that the same principles, concepts, and applications may also be applied to commercial entities. Additionally, it should be understood that numerous other modifications may be made to the illustrative embodiments and that other arrangements may be devised without departing from the spirit and scope of the present invention as defined by the appended claims.

The invention claimed is:

1. A system for facilitating data communication connection to a building from an optical fiber communication line running underground from a communication service provider source to a proximity of the building, the system comprising:
   an underground fiber optic branch line coupled to the fiber optic communication line and having a terminal end extending generally towards the building;
   a receptacle housing the terminal end of the fiber optic branch line, wherein the receptacle is disposed at least partly underground and is accessible from above ground; and
   a connector coupled to the terminal end of the fiber optic branch line and residing within the receptacle, wherein the connector includes a window for viewing light transmitted through a fiber optic cable coupled to the branch line via the connector.

2. The system of claim 1, wherein the receptacle is an underground hand-hole.

3. The system of claim 1, wherein the receptacle includes a cover configured to protect contents of the receptacle and provide access thereto.

4. The system of claim 1, wherein the receptacle is configured to house an electronic component.

5. The system of claim 1, wherein the receptacle has a cylindrical or cubical shape.

6. The system of claim 1, further comprising a visual indicator disposed within the receptacle configured to indicate connection between the fiber optic cable and the branch line.

7. The system of claim 6, wherein the visual indicator includes an LED.

8. The system of claim 6, further comprising a battery disposed within the receptacle to supply power to the visual indicator.

9. The system of claim 6, wherein the visual indicator is further configured to indicate that the connection is incomplete.

10. A method for facilitating data communication connection to a building from an optical fiber communication line running underground from a communication service provider source to a proximity of the building, the method comprising:

coupling a first end of a fiber optic branch line to the fiber optic communication line;

running the branch line underground so that a second end extends generally towards the building;

installing a receptacle at least partly underground to house the second end of the fiber optic branch line; and coupling a connector to the second end of the fiber optic branch line within the receptacle, wherein the connector comprises a window for viewing light transmitted through a fiber optic cable coupled to the branch line via the connector.

11. The method of claim 10, wherein the receptacle is accessible from above ground.

12. The method of claim 10, wherein the receptacle is an underground hand-hole.

13. The method of claim 10, wherein the receptacle includes a cover configured to protect contents of the receptacle and provide access thereto.

14. The method of claim 10, wherein the receptacle is configured to house an electronic component.

15. The method of claim 10, wherein the receptacle has a cylindrical or cubical shape.

16. The method of claim 10, wherein the receptacle includes a visual indicator disposed therein configured to indicate connection between the fiber optic cable and the branch line.

17. The method of claim 16, wherein the visual indicator includes an LED.

18. The method of claim 16, wherein the receptacle includes a battery disposed therein to supply power to the visual indicator.

19. The method of claim 16, wherein the visual indicator is further configured to indicate that the connection is incomplete.

* * * * *